(12) United States Patent
Yamada et al.

(10) Patent No.: US 10,440,671 B2
(45) Date of Patent: Oct. 8, 2019

(54) TERMINAL APPARATUS AND COMMUNICATION METHOD

(71) Applicant: SHARP KABUSHIKI KAISHA, Sakai, Osaka (JP)

(72) Inventors: Ryota Yamada, Sakai (JP); Kazuyuki Shimezawa, Sakai (JP); Hiromichi Tomeba, Sakai (JP); Katsuya Kato, Sakai (JP); Naoki Kusashima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/553,573

(22) PCT Filed: Mar. 10, 2016

(86) PCT No.: PCT/JP2016/057504
§ 371 (c)(1),
(2) Date: Aug. 24, 2017

(87) PCT Pub. No.: WO2016/147994
PCT Pub. Date: Sep. 22, 2016

(65) Prior Publication Data
US 2018/0054786 A1    Feb. 22, 2018

(30) Foreign Application Priority Data

Mar. 13, 2015  (JP) ................................. 2015-050195

(51) Int. Cl.
*H04W 56/00* (2009.01)
*H04L 7/04* (2006.01)
(Continued)

(52) U.S. Cl.
CPC ............. *H04W 56/001* (2013.01); *H04L 7/04* (2013.01); *H04W 16/32* (2013.01); *H04W 24/10* (2013.01);
(Continued)

(58) Field of Classification Search
CPC ... H04W 56/001; H04W 16/32; H04W 24/10; H04W 56/00; H04W 88/02; H04W 88/08
See application file for complete search history.

(56) References Cited

U.S. PATENT DOCUMENTS

| 9,461,766 B2 * | 10/2016 | Yi ......................... H04J 11/003 |
| 2010/0135257 A1 * | 6/2010 | Higuchi ............... H04J 11/0076 370/336 |

(Continued)

OTHER PUBLICATIONS

ARIB 2020 and Beyonde Ad Hoc Groupe, White Paper, "Mobile Communications Systems for 2020 and beyonde",Oct. 2014.
(Continued)

*Primary Examiner* — Ajay Cattungal
(74) *Attorney, Agent, or Firm* — ScienBiziP, P.C.

(57) ABSTRACT

Communication is efficiently performed even when the communication is performed in a high carrier frequency. A terminal apparatus includes: a reception unit configured to receive assistance information from a primary cell and a plurality of synchronization signals from a secondary cell and to perform synchronization on the basis of the assistance information and the plurality of synchronization signals; and a transmission unit configured to transmit measurement information regarding at least one of the plurality of synchronization signals. The assistance information includes respective pieces of information regarding the plurality of synchronization signals. The assistance information includes an ID of each of the plurality of synchronization signals, and the terminal apparatus transmits the ID as the measurement information regarding the synchronization signal.

8 Claims, 4 Drawing Sheets

(51) Int. Cl.
*H04W 16/32* (2009.01)
*H04W 24/10* (2009.01)
*H04W 88/02* (2009.01)
*H04W 88/08* (2009.01)

(52) U.S. Cl.
CPC ............ *H04W 56/00* (2013.01); *H04W 88/02* (2013.01); *H04W 88/08* (2013.01)

(56) References Cited

U.S. PATENT DOCUMENTS

| | | | | |
|---|---|---|---|---|
| 2010/0226467 | A1* | 9/2010 | Furukawa | H04L 7/042 375/359 |
| 2011/0280223 | A1* | 11/2011 | Maeda | H04W 4/08 370/335 |
| 2012/0069834 | A1* | 3/2012 | Ancora | H04L 27/2647 370/343 |
| 2012/0231805 | A1* | 9/2012 | Wang | H04J 11/0073 455/452.1 |
| 2014/0105114 | A1* | 4/2014 | Berggren | H03M 13/33 370/328 |
| 2014/0120934 | A1* | 5/2014 | Kishiyama | H04W 76/14 455/452.1 |
| 2016/0269137 | A1* | 9/2016 | Lindoff | H04W 72/082 |

OTHER PUBLICATIONS

3GPP TS 36.211 v12.3.0, "Physical channels and modulation", Sep. 2014.

* cited by examiner

TERMINAL APPARATUS AND COMMUNICATION METHOD

TECHNICAL FIELD

The present invention relates to a terminal apparatus and a communication method.

BACKGROUND ART

In recent years, smartphones, tablet terminals, and the like have rapidly spread. This is causing a problem of rapidly increasing traffic. To solve such a problem, studies have been and are being conducted on a system as a successor to a communication system (for example, NPL1) such as Long Term Evolution (LTE) and LTE-Advanced (LTE-A) in the Third Generation Partnership; Project (3GPP) or a fifth generation mobile communication system as a new radio communication system. The fifth generation mobile communication system is disclosed in, for example, NPL 2.

CITATION LIST

Non Patent Literature

NPL 1: 3GPP TS 36.211 v12.3.0, "Physical channels and modulation", September 2014.
NPL 2: ARIB 2020 and Beyond Ad Hoc Group, White Paper, "Mobile Communications Systems for 2020 and beyond", October 2014.

SUMMARY OF INVENTION

Technical Problem

For example, in the fifth generation mobile communication system, communication using a carrier frequency higher than that used in each of LTE and LTE-A has been studied in order to realize high-speed transmission using a broader band. However, LTE and LTE-A described in NPL 1 may not be able to produce a sufficient performance in the case of communication using a high carrier frequency.

In view of the foregoing, the present invention is directed to a terminal apparatus and a communication method which enable efficient communication even in the case of communication using a high carrier frequency.

Solution to Problem

To solve the problems described above, a terminal apparatus and a communication method according to the present invention have the following configurations.

A terminal apparatus according to the present invention includes: a reception unit configured to receive assistance information from a primary cell and a plurality of synchronization signals from a secondary cell and to perform synchronization on the basis of the assistance information and the plurality of synchronization signals; and a transmission unit configured to transmit measurement information regarding at least one of the plurality of synchronization signals.

Moreover, in the terminal apparatus of the present invention, the assistance information includes respective pieces of information regarding the plurality of synchronization signals.

Moreover, in the terminal apparatus of the present invention, the assistance information includes an ID of each of the plurality of synchronization signals, and the terminal apparatus transmits the ID as the measurement information regarding the synchronization signal.

Moreover, in the terminal apparatus of the present invention, the assistance information includes information regarding a measurement reference signal, and the terminal apparatus transmits the information as the measurement information regarding the synchronization signal inclusively of received power measured by the CSI-RS.

A communication method of the present invention is a communication method performed by a terminal apparatus, the method including: a reception step of receiving assistance information from a primary cell and a plurality of synchronization signals from a secondary cell to perform synchronization on the basis of the assistance information and the plurality of synchronization signals; and a transmission step of transmitting measurement information regarding at least one of the plurality of synchronization signals.

Advantageous Effects of Invention

The present invention enables efficient communication even in the case of communication using a high carrier frequency.

DESCRIPTION OF EMBODIMENTS

A communication system of the present embodiment includes a base station apparatus (transmitter, cell, transmission point, transmit antenna group, transmit antenna port group, component carrier, or eNodeB) and a terminal apparatus (terminal, mobile terminal, reception point, receiving terminal, receiver, receive antenna group, receive antenna port group, or UE).

In the present embodiment, "X/Y" includes the meaning of "X or Y". In the present embodiment, "X/Y" includes the meaning of "X and Y". In the present embodiment, "X/Y" includes the meaning of "X and/or Y".

Figure 1:
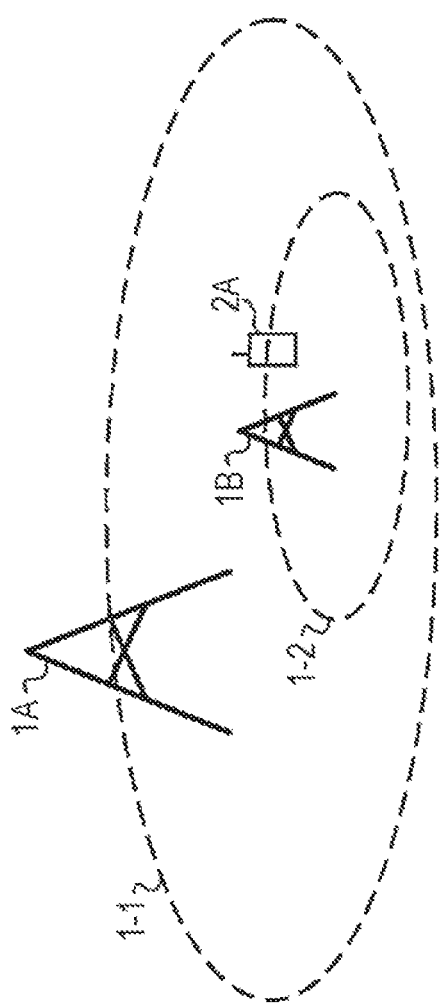
FIG. 1 is a view illustrating an example of a communication system according to an embodiment.

FIG. 1 is a view illustrating an example of the communication system according to the present embodiment. As illustrated in FIG. 1, the communication system of the present embodiment includes base station apparatuses 1A and 1B and a terminal apparatus 2A. Coverage 1-1 is an area (communication area) in which the base station apparatus 1A is connectable to terminal apparatuses. Coverage 1-2 is an area (communication area) in which the base station apparatus 1B is connectable to terminal apparatuses. The terminal apparatus 2A is connectable to the base station apparatus 1A and/or 1B.

In FIG. 1, the following uplink physical channels are used for uplink wireless communication from a terminal apparatus 2A to the base station apparatus 1A. The uplink physical channels are used to transmit information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). Here, the uplink control information includes a positive acknowledgement (ACK) or a negative acknowledgement (NACK) (ACK/NACK) with respect to downlink data (downlink transport block, Downlink-Shared Channel: DL-SCH). The ACK/NACK with respect to the downlink data is also referred to as HARQ-ACK or HARQ feedback.

The uplink control information further includes Channel State Information (CSI) with respect to a downlink. The uplink control information also includes a Scheduling Request (SR) used to request a resource of an Uplink-Shared Channel (UL-SCH). The channel state information corresponds to, for example, a rank indicator RI specifying an optimal spatial multiplexing number, a precoding matrix indicator PMI specifying an optimal precoder, or a channel quality indicator CQI specifying an optimal transmission rate.

The channel quality indicator CQI (hereinafter referred to as a CQI value) may be an optimal modulation scheme (for example, QPSK, 16QAM, 64QAM, or 256QAM) or a coding rate in a predetermined band. The CQI value may be an index (CQI Index) specified by the modulation scheme or the coding rate. The CQI value may be a value predetermined in the system.

The rank indicator and the precoding quality indicator may be predetermined by the system. The rank indicator may be an index specified by the spatial multiplexing number, and the precoding matrix indicator may be an index specified by precoding matrix information. Values of the rank indicator, the precoding matrix indicator, and the channel quality indicator CQI are collectively referred to as CSI values.

The PUSCH is used to transmit uplink data (uplink transport block, UL-SCH). The PUSCH may be used to transmit the ACK/NACK and/or the channel state information together with the uplink data. The PUSCH may be used to transmit only the uplink control information.

The PUSCH is also used to transmit an RRC message. The RRC message is information/a signal processed in a Radio Resource Control (RRC) layer. The PUSCH is used to transmit a MAC Control Element (CE). Here, the MAC CE is information/a signal processed (transmitted) in a Medium Access Control (MAC) layer.

For example, power headroom may be included in the MAC CE and reported via the PUSCH. That is, the field of the MAC CE may be used to show the level of the power headroom.

The PRACH is used to transmit a random access preamble.

In the uplink wireless communication, an Uplink Reference Signal (UL RS) is used as an uplink physical signal. The uplink physical signal is not used to transmit information output from the higher layer, but is used by a physical layer. Here, the uplink reference signal includes a Demodulation Reference Signal (DMRS) and a Sounding Reference Signal (SRS).

The DMRS is related to transmission on the PUSCH or the PUCCH. For example, the base station apparatus 1A uses the DMRS to perform channel correction on the PUSCH or the PUCCH, The SRS is not related to transmission on the PUSCH or the PUCCH, For example, the base station apparatus 1A uses the SRS to measure the uplink channel state.

In FIG. 1, downlink wireless communication from the base station apparatus 1A to the terminal apparatus 2A uses the following downlink physical channels. The downlink physical channel is used to transmit information output from the higher layer.

Physical Broadcast Channel: broadcast channel (PBCH)
Physical Control Format Indicator Channel: control format indicator channel (PCFICH)
Physical Hybrid automatic repeat request Indicator Channel: HARQ indicator channel (PHICH)
Physical Downlink Control Channel: downlink control channel (PDCCH)
Enhanced Physical Downlink Control Channel: enhanced downlink control channel (EPDCCH)
Physical Downlink Shared Channel: downlink shared channel (PDSCH)

The PBCH is used to broadcast a Master Information Block (MIB, Broadcast Channel: BCH) shared by the terminal apparatuses. The PCFICH is used to transmit information specifying a range used for transmission on the PDCCH (for example, the number of OFDM symbols).

The PHICH is used to transmit the ACK/NACK with respect to the uplink data (transport block, codeword) received by the base station apparatus 1A. That is, the PHICH is used to transmit a HARQ indicator: (HARQ feedback) indicating the ACK/NACK with respect to the uplink data. The ACK/NACK is also referred to as HARQ-ACK. The terminal apparatus 2 notifies the higher layer of the received ACK/NACK. The ACK of the ACK/NACK indicates correct reception, and the NACK of the ACK/NACK indicates incorrect reception, DTX indicates that there is no corresponding data. When no PHICH exists for the uplink data, the terminal apparatus 2A notifies the higher layer of the ACK.

The PDCCH and the EPDCCH are used to transmit Downlink Control Information (DCI). Here, a plurality of DCI formats are defined with respect to transmission of the downlink control information. That is, fields with respect to the downlink control information are defined in the DCI formats and are mapped to information bits.

For example, a DCI format 1A used for scheduling of one PDSCH (transmission of one downlink transport block) in one cell is defined as a DCI format with respect to the downlink.

For example, the DCI format with respect to the downlink includes information about the resource allocation of the PDSCH, information about a Modulation and Coding Scheme (MCS) with respect to the PDSCH, and the downlink control information such as a TPC command with respect to the PUCCH. Here, the DCI format with respect to the downlink is also referred to as a downlink grant (or a downlink assignment).

For example, a DCI format 0 used for scheduling of one PUSCH (transmission of one uplink transport block) in one cell is defined as a DCI format with respect to the uplink.

For example, the DCI format with respect to the uplink includes information about the resource allocation of the PUSCH, information about the MCS with respect to the PUSCH, and the uplink control information such as a TPC command with respect to the PUSCH. The DCI format with respect to the uplink is also referred to as an uplink grant (or an uplink assignment).

The DCI format with respect to the uplink may be used to request Channel State Information (CSI: also referred to as received quality information) of the downlink (CSI request). The channel state information corresponds to, for example, a Rank Indicator (RI) specifying an optimal spatial multiplexing number, a Precoding Matrix Indicator (PMI) specifying an optimal precoder, a Channel Quality Indicator (CQI) specifying am optimal transmission rate, or a Precoding type Indicator (PTI).

Moreover, the DCI format with respect to the uplink may be used for a configuration which indicates an uplink resource to which a channel state information report (CSI feedback report) fed back from, the terminal apparatus to the base station apparatus is mapped. For example, the channel state information report may be used for a configuration which indicates an uplink resource to which periodic channel state information (Periodic CSI) is reported. The channel state information report may be used to configure a mode for periodically reporting the channel state information (CSI report mode).

For example, the channel state information report may be used for a configuration which indicates an uplink resource to which aperiodic channel state information (Aperiodic CSI) is reported. The channel state information report may be used to configure a mode for aperiodically reporting channel state information (CSI report mode). Base station apparatuses may configure the periodic channel state information report or the aperiodic channel state information report. The base station apparatuses may configure both the periodic channel state information report and the aperiodic channel state information report.

The DCI format with respect to the uplink may be used for a configuration which indicates a type of the channel state information report fed back from the terminal apparatus to the base station apparatus. Examples of the types of the channel state information report include broadband CSI (for example, Wideband CQI) and narrowband CSI (for example, Subband CQI).

When a resource of the PDSCH is scheduled by using the downlink assignment, the terminal apparatus receives the downlink data via the scheduled PDSCH. When a resource of the PUSCH is scheduled by using the uplink grant, the terminal apparatus transmits the uplink data and/or the uplink control information via the scheduled PUSCH.

The PDSCH is used to transmit downlink data (downlink transport block, DL-SCH). The PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

The PDSCH is used to transmit an RRC message. Here, the RRC message transmitted from the base station apparatus may be shared by a plurality of terminal apparatuses in a cell. Alternatively, the RRC message transmitted from the base station apparatus 1A may be a message dedicated to a terminal apparatus 2 (also referred to as dedicated signaling). That is, user apparatus-specific information is transmitted by using a message dedicated to a terminal apparatus. The PDSCH is used to transmit the MAC CE.

Here, the RRC message and/or the MAC CE are/is also referred to as higher layer signaling.

The PDSCH may be used to request downlink channel state information. The PDSCH may be used to transmit an uplink resource to which a channel state information report (CSI feedback report) fed back from the terminal apparatus to the base station apparatus is mapped. For example, the channel state information report may be used for a configuration which indicates an uplink resource to which periodic channel state information (Periodic CSI) is reported. The channel state information report may be used to configure a mode for periodically reporting the channel state information (CSI report mode).

Examples of the types of the downlink channel state information report include broadband CSI (for example, Wideband CSI) and narrowband CSI (for example, Subband CSI). In the case of the broadband CSI, one piece of channel state information is calculated with respect to the system band of a cell. In the case of the narrowband CSI, the system band is partitioned into predetermined units of segments, and one piece of channel state information is calculated for each segment.

For the downlink wireless communication, a Synchronization signal (SS) and a Downlink Reference Signal (DL RS) are used as downlink physical signals. The downlink physical signals are not used to transmit information output from the higher layer but are used by the physical layer.

The synchronization signal is used by the terminal apparatus to synchronize with a downlink frequency domain and a time domain. The downlink reference signal is used by the terminal apparatus to perform a channel correction of the downlink physical channel. For example, the downlink reference signal is used by the terminal apparatus to calculate downlink channel state information.

Here, the downlink reference signal includes a Cell-specific Reference Signal (CRS), a UE-specific Reference Signal (URS) being related to the PDSCH, a Demodulation Reference Signal (OMRS) being related to the EPDCCH, a Non-Zero Power Channel State Information-Reference Signal (NZP CSI-RS), and a Zero Power Channel State Information-Reference Signal (ZP CSI-RS).

The CRS is transmitted over the entire band of a subframe and is used to demodulate the PBCH/PDCCH/PHICH/PCFICH/PDSCH. The URS being related to the PDSCH is transmitted in a subframe and a band used for transmission on the PDSCH to which the URS is related, and the URS is used to demodulate the PDSCH to which the URS is related.

The DMRS being related to the EPDCCH is transmitted in a subframe and a band used for transmission on the EPDCCH to which the DMRS is related. The DMRS is used to demodulate the EPDCCH to which the DMRS is related.

The base station apparatus 1A configures the resource of the NZP CSI-RS. For example, the terminal apparatus 2A measures a signal (measures a channel) by using the NZP CSI-RS. The base station apparatus 1A configures the resource of the ZP CSI-RS. The base station apparatus 1A transmits the ZP CSI-RS with zero power. For example, the terminal apparatus 2A measures interference in a resource to which the NZP CSI-RS corresponds.

The base station apparatus 1A configures the resource of the ZP CSI-RS. The base station apparatus 1B transmits the ZP CSI-RS with zero power. That is, the base station apparatus 1A transmits no ZP CSI-RS. The base station apparatus 1B does not transmit the configured resource of the ZP CSI-RS on the PDSCH or the EPDCCH. For example, the terminal apparatus 2B may measure interference in a resource to which the NZP CSI-RS corresponds in a cell.

A Multimedia Broadcast multicast service Single Frequency Network (MBSFN) RS is transmitted over the entire band of the subframe used for transmission on a PMCH. The MBSFN RS is used to demodulate the PMCH. The PMCH is transmitted via an antenna port used for transmission of the MBSFN RS.

Here, the downlink physical channel and the downlink physical signal are collectively referred to as downlink signals. The uplink physical channel and the uplink physical signal are also collectively referred to as uplink signals. The downlink physical channel and the uplink physical channel are also collectively referred to as physical channels. The downlink physical signal and the uplink physical signal are collectively referred to as physical signals.

The BCH, the UL-SCH, and the DL-SCH are transport channels. A channel used in a MAC layer is referred to as a transport channel. The unit of the transport channel used in the MAC layer is referred to as a Transport Block (TB) or a MAC Protocol Data Unit (PDU). The transport block is the unit of the data which the MAC layer delivers to the physical layer. In the physical layer, transport blocks are mapped to codewords, and a coding process, and other processes are performed on each of the codewords.

The base station apparatus 1B is capable of performing communication by using a high frequency of, for example, 6 GHz or higher. In general, as the frequency increases, the path loss increases and the coverage decreases. Thus, the base station apparatus may be provided with a large number of antennas, and precoding (or beamforming) may be performed to secure the coverage.

When communication is performed by using a high frequency band, the base station apparatus 1B may perform communication by using a frame structure (Radio Access Technology: RAT) different from a frame structure used in the case where the communication is not performed by using the high frequency band. The frame structure in the case where the communication is not performed by using the high frequency band is also referred to as a first frame structure (first radio access technology). The frame structure in the case where the communication is performed by using the high frequency band is also referred to as a second frame structure (second radio access technology). The frame structure includes some or all of parameters such as subcarrier spacing, maximum system bandwidth, communication frequency band, Resource Block (RB) size (number of subcarriers), number of resource blocks, number of resource elements, frame length, subframe length, and slots. Note that the first frame structure and the second frame structure are not necessarily used in different frequency bands. For example, the first frame structure may be used in a licensed band, and the second frame structure may be used in an unlicensed band. Moreover, switching between the first frame structure and the second frame structure is possible depending on services, applications, required communication speeds, etc.

For example, the number of resource blocks in the second frame structure may be larger than that in the first frame structure. In this case, if the subcarrier spacing of an Orthogonal Frequency Division Multiplexing (OFDM) symbol is the same in the first frame structure and the second frame structure, the number of resource blocks available for communication in the second frame structure is larger than the number of resource blocks available for communication in the first frame structure, and the second frame structure thus enables broadband communication. Moreover, when the number of resource blocks increases, the number of FFT points of Inverse Fast Fourier Transform (IFFT) used to generate the OFDM symbol increases. For example, when the number of resource blocks used in the second frame structure is 500 as the maximum, the number of FFT points may be 8192.

Moreover, for example, in the second frame structure, the number of subcarriers per resource block may be increased as compared to the first frame structure. In this case, broadband communication becomes possible in the second frame structure even when the number of resource blocks available in the second frame structure is equal to the number of resource blocks available in the first frame structure. For example, the number of subcarriers per resource block used in the second frame structure may be n times the number of subcarriers per resource block used in the first frame structure (n is a natural number). For example, when n=5, the number of subcarriers per resource block in the second frame structure is 60, and the number of FFT points used for OFDM symbol generation may be 8192.

Moreover, one resource block in the second frame structure may be constituted of a plurality of resource blocks in the first frame structure. For example, when the number of subcarriers of the resource block in the second frame structure is 60, the resource block in the second frame structure is constituted of five resource blocks in the first frame structure. Note that in the second frame structure, the resource blocks in the first frame structure may be referred to as sub-resource blocks. In other words, the second frame structure may include a resource block set constituted of the plurality of resource blocks in the first frame structure and may use the resource block set in a similar manner to the resource block in the first frame structure.

Moreover, for example, in the second frame structure, the subcarrier spacing of the OFDM symbol may be expanded as compared to the first frame structure. In this case, if in the second frame structure, resource blocks having the same size as those in the first frame structure and the same number of resource blocks as in the first frame structure are available, the OFDM symbol length of the second frame structure is shorter than the OFDM symbol length of the first frame structure. For example, the subcarrier spacing of the OFDM symbol in the second frame structure may be m times the subcarrier spacing of the first frame structure (m is a natural number). For example, when m=5, the subcarrier spacing of the OFDM symbol in the second frame; structure is 75 kHz, and the OFDM symbol length in the second frame structure is ⅕ of the OFDM symbol length in the first frame structure. Note that the length of a CP added to the OFDM symbol may be reduced to ⅕. Here, when the base station apparatus 1B uses the second frame structure, a frame with 10 milliseconds as a unit and a subframe with 1 millisecond as a unit may be used similarly to the first frame structure. In this case, the first frame structure and the second frame structure differ from each other in the number of OFDM symbols included in one frame/subframe.

Moreover, when the first frame structure and the second frame structure differ from each other in subcarrier spacing and are the same in frame length and subframe length, the number of OFDM symbols included in one frame and one subframe in the second frame structure is larger than that in the first frame structure. For example, in the second frame structure, when the subcarrier spacing is 75 kHz and the OFDM symbol length is ⅕ of that of the first frame structure, the number of OFDM symbols included in one subframe is 70 symbols.

Moreover, when the first frame structure and the second frame structure differ from each other in subcarrier spacing and are the same in frame length and in the number of OFDM symbols in one subframe, the subframe length in the second frame structure is reduced, and the number of subframe length in one frame increases. For example, it is assumed that the subcarrier spacing of the OFDM symbol in the second frame structure is 75 kHz, and the OFDM symbol length in the second frame structure is reduced to ⅕. Here, the subframe length in the second frame structure is 0.2 milliseconds, and the number of subframes in one frame is 50. Moreover, the second frame structure may use a subframe group constituted of a plurality of subframes. For example, in this example, one subframe group is constituted of 10 subframes, and in one subframe group, operation/processing similar to that in the subframe in the first frame structure is performed. In another example, one subframe group is constituted of five subframes, and the subframe group and the subframe of the first frame structure have similar roles. In other words, the subframe in the second frame structure is constituted of a plurality of subframes in the first frame structure.

Moreover, for example, in the second frame structure, two or more of the subcarrier spacing of the OFDM symbol, the number of resource blocks, and the number of subcarriers per resource block may differ from those in the first frame structure.

Moreover, when the terminal apparatus supports carrier aggregation, the base station apparatus may configure a larger number of Secondary Cells (SCells) in the case of using the second frame structure than in the case of using the first frame structure. Moreover, the first frame structure may be used by the Primary Cell (PCell), and the second frame structure may be used by the secondary cell. In this case, the second frame structure is used only in the case of the carrier aggregation. That is, the terminal apparatus enables carrier aggregation of the first frame structure and the second frame structure.

Moreover, when the first frame structure and the second frame structure differ from each other in subcarrier spacing and are the same in frame length and subframe length, transmission is performed by using the first frame structure in the primary cell, and transmission is performed by using the second frame structure in the secondary cell, the terminal apparatus can assume that the subframes (boundary of the subframes, subframe indices) of the primary cell and the secondary cell are synchronized.

Moreover, when the subframe length of the second frame structure is shorter than that of the first frame structure, transmission is performed by using the first frame structure in the primary cell, and transmission is performed by using the second frame structure in the secondary cell, the terminal apparatus assumes that one subframe of the primary cell and the plurality of subframes (the subframe group) of the secondary cell are synchronized. For example, when the subframe length of the second frame structure is ⅕ of that of the first frame structure, the terminal apparatus can assume that the nth subframe of the primary cell (n is an integer greater than or equal to 0) is synchronized with the 5nth subframe, the (5n+1)th subframe, the (5n+2)th subframe, the (5n+3)th subframe, and the (5n+4)th subframe of the secondary cell.

Moreover, the first frame structure may be used in Frequency Division Duplex (FDD) and Time Division Duplex (TDD), but the second frame structure enables transmission in only TDD. Moreover, the second frame structure may be used in only a downlink.

Moreover, in the first frame structure, the terminal apparatus can assume that at least the CRS is transmitted in a serving cell in an activated state. In the second frame structure, the terminal apparatus can assume that at least the CRS is not transmitted.

To start communication between the base station apparatus and the terminal apparatus, the terminal apparatus first has to achieve synchronization by using a synchronization signal transmitted from the base station apparatus. Here, in order to secure coverage, the base station apparatus may perform precoding of the synchronization signal to transmit a precoded synchronization signal. The precoding is desirably precoding suitable for the terminal apparatus. However, at the start of the communication, the base station apparatus does not know precoding suitable for the terminal apparatus. Thus, the base station apparatus may transmit a plurality of synchronization signals precoded differently. Here, the terminal apparatus can efficiently achieve synchronization by using the synchronization signal precoded suitably for the terminal apparatus.

Figure 2:
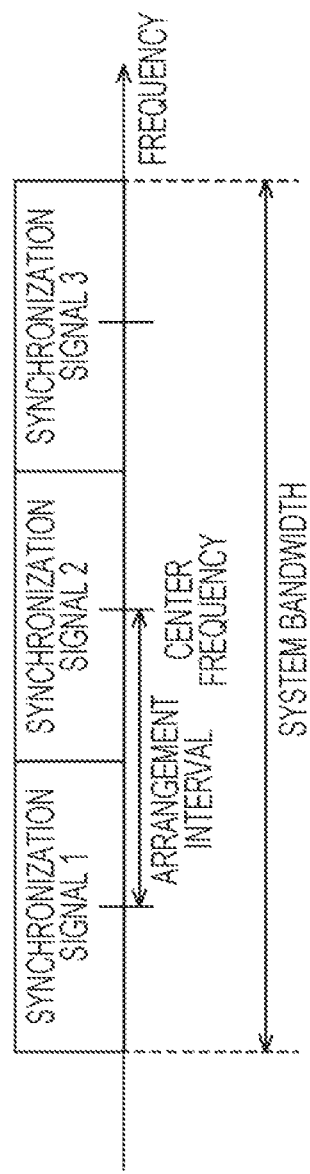
FIG. 2 is a view illustrating a configuration example of a training signal according to the embodiment.

For example, the base station apparatus 1B may transmit a signal including a plurality of synchronization signals as a signal for synchronization. The base station apparatus 1B may differently precode some or all of the plurality of synchronization signals. The plurality of synchronization signals before the precoding may have the same synchronization sequences (for example, may have the same initial values generating the sequence) or different synchronization sequences (for example, may have different initial values generating the sequences). FIG. 2 shows an example of frequency multiplexing of the plurality of synchronization signals. In the example of FIG. 2, the frequency multiplexing of three types of synchronization signals, that is, a synchronization signal 1, a synchronization signal 2, and a synchronization signal 3 is performed in a system bandwidth. Note that the configuration of FIG. 2 is a mere example, and other configurations are also within the scope of the invention. For example, the base station apparatus 1B may perform frequency multiplexing of a given number of synchronization signals. Moreover, the plurality of synchronization signals do not have to have the same lengths (bandwidths). Moreover, in FIG. 2, only the example of multiplexing of the synchronization signals is shown, but other signals such as reference signals, control signals, etc. may be multiplexed and transmitted. Moreover, the base station apparatus 1B may transmit a plurality of types of synchronization signals such as a Primary Synchronization Signal (PSS) and a Secondary Synchronization Signal (SSS). The base station apparatus 1B may perform frequency multiplexing and transmitting of the plurality of types of synchronization signals or transmit the plurality of types of synchronization signals as different OFDM symbols. Moreover, the base station apparatus 1B may multiplex a plurality of signals of each type. For example, the base station apparatus 1B may transmit a plurality of PSSs or a plurality of SSSs.

Moreover, synchronization signals transmitted from a plurality of base station apparatuses may be frequency-multiplexed. For example, it is assumed that two base station apparatuses 1 and 2 transmit synchronization signals, wherein the base station apparatus 1 transmits the synchronization signals 1 to 3, and the base station apparatus 2 transmits synchronization signals 4 to 6. In this case, the terminal apparatus 2A receives the synchronization signals 1 to 6 which have been frequency multiplexed. When synchronization signals transmitted from the plurality of base station apparatuses are frequency multiplexed, coordination may be performed so that the assignments of the synchronization signals do not overlap each other between base stations. The coordination between the base stations may be performed by using a backhaul line. Moreover, resources to which cell IDs/synchronization signals are to be assigned may be associated with the base stations.

Moreover, the base station apparatus 1B may transmit a discovery signal which the terminal apparatus 2A uses to discover the base station apparatus 1B. The discovery signal includes a synchronization signal and a reference signal. The base station apparatus 1B may transmit a plurality of discovery signals having different precoding patterns. Here, the terminal apparatus 2A uses the plurality of discovery signals, which the terminal apparatus 2A has received, to enable efficient detection of the base station apparatus 1B.

Moreover, the base station apparatus 1B may transmit an OFDM symbol constituted of a plurality of synchronization signals/reference signals/discovery signals. Moreover, the OFDM symbol constituted of the synchronization signals/reference signals/discovery signals may be some or all of the subframes.

Moreover, the base station apparatus 1B may transmit the signal constituted of the synchronization signals/reference signals/discovery signals independently of the frame used for data communication for Auto Gain Control (AGC) for controlling an amplification level to maintain an appropriate; signal level, synchronization, and tracking. Moreover, the base station apparatus 1B may transmit the signal constituted of the synchronization signals/reference signals/discovery signals non-periodically. Moreover, in the base station apparatus 1B, the signal constituted of the synchronization signals/reference signals/discovery signals may nave a frame structure which is different from both the first frame structure and the second frame structure, or a frame structure which is the same as the first frame structure or the second frame structure. Moreover, the base station apparatus 1B may transmit the signal constituted of the synchronization signals/reference signals/discovery signals in a communication schema other than the OFDM.

When the terminal apparatus 2A supports the carrier aggregation, the terminal apparatus 2A may perform communication, with the base station apparatus 1A being defined as the PCell and the base station apparatus 1B being defined as the SCell.

When a cell search for the base station apparatus 1B as the SCell is performed in the case where the base station apparatus 1A as the PCell communicates with the terminal apparatus 2A, the PCell may transmit to the terminal apparatus 2A, assistance information (PCell assistance information, assistance information, SCell configuration information, configuration information regarding measurement) which the terminal apparatus 2A uses to detect the SCell. The assistance information is transmitted by higher layer signaling or physical layer signaling. In other words, the terminal apparatus 2A receives the assistance information from the PCell and may perform the cell search for the SCell on the basis of the assistance information. Moreover, in other words, the terminal apparatus 2A may perform synchronization/measurement (for example, Radio Resource Management (RRM) measurement) with an assumption that the synchronization signal/discovery signal/frame structure of the SCell in which the PCell assistance information is configured differs from the synchronization signal/discovery signal/frame structure of the SCell in which the PCell assistance information is not configured. The terminal apparatus 2A may receive a plurality of synchronization signals, measure received power/received quality from the related reference signal, and transmit to the base station apparatus 1A/1B results of the measurement that satisfy conditions.

Moreover, the base station apparatus 1A may transmit assistance information for the discovery signal. The terminal apparatus 2A may receive a plurality of discovery signals, measure received power/received quality, and transmit to the base station apparatus 1A/1B results of the measurement that satisfy the conditions.

The PCell assistance information includes some or all of, for example, a carrier frequency band, the system bandwidth, a synchronization signal configuration list, and a center frequency.

The synchronization signal configuration list is constituted of configuration information regarding each of synchronization signals which are signal-multiplexed. The configuration information of the synchronization signal includes some or all of the synchronization signal identity (ID), the parameter of the synchronization signal, the center frequency, and the difference from the center frequency. The parameter of the synchronization signal is some or all of, for example, the physical cell ID, physical cell ID candidates, the parameter (for example, root index) of synchronization signal sequence generation, a phase rotation amount, and a cyclic shift amount. The parameter of the synchronization signal may be associated with the difference from the center frequency. The difference from the center frequency represents how much the synchronization signal departs from, the center frequency. The difference from the center frequency can directly represent the difference or can represent an index. For example, when the base station apparatus 1A sets a value of 100 as the difference from the center frequency, the terminal apparatus 2A may determine that the difference from the center frequency is 100 kHz. Moreover, when an index of 2 is set as the difference from the center frequency in the base station apparatus 1A, the terminal apparatus 2A may multiply the set index by a constant (for example, multiplies by 100 KHz) and determine that the difference from the center frequency is 2×100 kHz=200 kHz.

The base station apparatus 1A may configure configuration information of CSI-RS for measurement as the assistance information from the PCell. The configuration information of the CSI-RS for measurement includes some or all of the ID of a measurement CSI-RS, the physical cell ID, scrambling identity, and information (parameter) indicating a CSI-RS configuration.

The configuration information of the CSI-RS for measurement may be associated with the configuration information of the synchronization signal. For example, the base station apparatus 1A may incorporate the synchronization signal ID into the configuration information of the CSI-RS for measurement and associate the configuration information of the CSI-RS for measurement with the configuration information of the synchronization signal by using the synchronization signal ID. Here, the terminal apparatus 2A may incorporate the synchronization ID into a report when reporting a result in response to the configuration information of the CSI-RS for measurement.

Moreover, the configuration information of the CSI-RS for measurement and the configuration information of the synchronization signal may be configured simultaneously. For example, the base station apparatus 1A can transmit the PCell assistance information inclusively of some or all of the carrier frequency band, the system bandwidth, the discovery signal configuration list, and the center frequency. The discovery signal configuration list is constituted of configuration information regarding a plurality of discovery signals. The configuration information of the discovery signal includes some or all of the discovery signal ID, the arrangement of discovery signals, the transmission interval of the discovery signals, the configuration information of the synchronization signal, the configuration information of the CSI-RS for measurement, the center frequency, and the difference from the center frequency.

The terminal apparatus 2A performs synchronization/measurement of the SCell on the basis of the PCell assistance information, and the terminal apparatus 2A reports to the base station apparatus 1A/1B, results that satisfy conditions such as Reference Signal Received Power (RSRP, received power). The terminal apparatus 2A may report some or all of the RSRP, Reference Signal Received quality (RSRQ, received quality), Transmit Point ID (TPID), information regarding the synchronization signal, information regarding the CSI-RS, information regarding the discovery signal, information (parameter) showing the transmission point, and information regarding adjacent cells. Note that the RSRP or RSRQ may be measured by the CRS or the CSI-RS. The RSRP measured by the CSI-RS is also referred to as CSI-RSRP. Moreover, the RSRQ measured by the CSI-RS is also referred to as a CSI-RSRQ. The RSRP and the RSRQ may be reported by mapping the measured values to values to be reported. The information regarding the synchronization signal is some or all of the synchronization signal ID and the difference from the center frequency. The information regarding the discovery signal is some or all of the discovery signal ID, the ID of the measurement the CSI-RS, the RSRP, and the RSRQ. The information regarding the CSI-RS is some or all of the ID of the measurement CSI-RS, CSI-RS configuration, the position of the CSI-RS, the RSRP, and the RSRQ. The information regarding the adjacent cells is some or all of the physical cell ID, the RSRP of the adjacent cells, and the RSRQ of the adjacent cells.

Moreover, when the lengths of a plurality of types of Cyclic Prefixes (CPs) can be set in the SCell, information indicating a CP length which the PCell has may be configured/transmitted. Moreover, the PCell may configure/transmit the system frame number of the SCell.

Moreover, the base station apparatus 1B may transmit an initial signal (beginning signal, preamble, training signal) transmitted for starting of the data transmission. The initial signal is used for some or all of the auto gain control, channel reservation, synchronization, tracking, RRM measurement, cell specification, and detection of transmission from the SCell (base station apparatus). Moreover, the initial signal includes some or all of the synchronization signal/reference signal/discovery signal, a signal for the auto gain control, and a signal for the channel reservation. Moreover, the initial signal may be, but does not have to be, an OFDM symbol. Moreover, the initial signal may be a signal of a part of the OFDM symbol. Moreover, the initial signal may be a plurality of OFDM symbols. The terminal apparatus 2A performs, on the basis of the initial signal, some or all of the auto gain control, synchronization, tracking, RRM measurement, cell specification, and detection of transmission from the SCell (base station apparatus), and reports to the base station apparatus if necessary.

Moreover, the base station apparatus 1A/1B may configure initial signal information which is assistance information regarding the initial signal. The assistance information regarding the initial signal includes some or all of the position of the initial signal, the ID, the frequency, and the bandwidth of the initial signal. The terminal apparatus 2A performs, on the basis of the initial signal information transmitted from the base station apparatus, some or all of the auto gain control, channel reservation, synchronization, tracking, RRM measurement, cell specification, and detection of transmission from the SCell (base station apparatus).

Moreover, the base station apparatus 1A/1B may be configured such that only some SCells transmit the initial signal. In other words, the base station apparatus 1A/1B may be configured as an SCell which is capable of transmitting the initial signal and another SCell which is not capable of transmitting the initial signal. The SCell which is not capable of transmitting the initial signal is also referred to as a first SCell. The SCell which is capable of transmitting the initial signal is also referred to as a second SCell (extension SCell). In other words, the base station apparatus 1A/1B does not configure the initial signal information in the first SCell but can configure the initial signal information in the second SCell. When the second SCell is configured, the terminal apparatus 2A performs, on the basis of the initial signal information transmitted from the base station apparatus, some or all of the auto gain control, channel reservation, synchronization, tracking, RRM measurement, cell specification, and detection of transmission from the SCell (base station apparatus).

Moreover, the base station apparatus may configure different functions and options in the first SCell and the second SCell. Moreover, the second SCell may configure a maximum number of component carriers enabling aggregation of many carriers as compared to the first SCell. Moreover, the first SCell and the second SCell may perform transmission in different frame structures. For example, the first SCell does not perform transmission in the second frame structure, and the second SCell may perform transmission in the second frame structure. Note that the SCell which is capable of performing transmission in the second frame structure and the SCell which is capable of transmitting the initial signal may be configured differently. In this case, the SCell which is capable of transmitting the second frame structure is also referred to as a third SCell.

Figure 3:
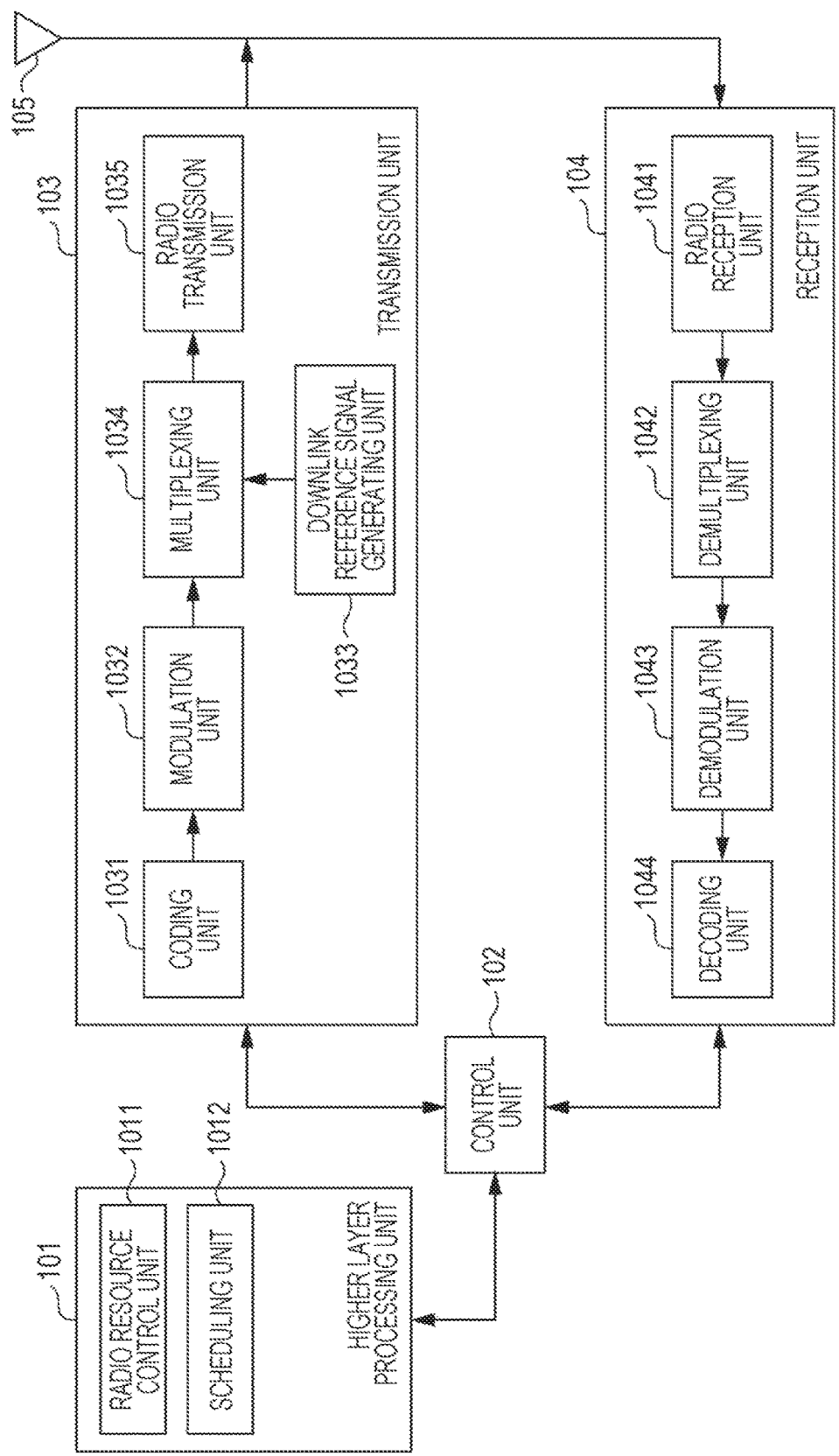
FIG. 3 is a block diagram illustrating a configuration example of a base station apparatus according to the embodiment.

FIG. 3 is a block diagram schematically illustrating the configuration of the base station apparatus of the present embodiment. As illustrated in FIG. 2, the base station apparatus includes a higher layer processing unit (higher layer process step) 101, a control unit (control step) 102, a transmission unit (transmission step) 103, a reception unit (reception step) 104, and a transmit/receive antenna 105. The higher layer processing unit 101 includes a radio resource control unit (radio resource control step) 1011 and a scheduling unit (scheduling step) 1012. The transmission unit 103 includes a coding unit (coding step) 1031, a modulation unit (modulation step) 1032, a downlink reference signal generating unit (downlink reference signal generating step) 1033, a multiplexing unit (multiplexing step) 1034, and a radio transmission unit (radio transmission step) 1035. The reception unit 104 includes a radio reception unit (radio reception step) 1041, a demultiplexing unit (demultiplexing step) 1042, a demodulation unit (demodulation step) 1043, and a decoding unit (decoding step) 1044.

The higher layer processing unit 101 processes a Medium Access Control (MAC) layer, a Packet Data Convergence Protocol (PDCP) layer, a Radio Link Control (RLC) layer, and a Radio Resource Control (RRC) layer. The higher layer processing unit 101 generates information required to control the transmission unit 103 and the reception unit 104 and outputs the generated information to the control unit 102.

The higher layer processing unit 101 receives from the terminal apparatus information regarding the terminal apparatus such as the function (UE capability) of the terminal apparatus. In other words, the terminal apparatus transmits the capability of the terminal apparatus to the base station apparatus by higher layer signaling.

Note that in the following description, information regarding the terminal apparatus includes information showing whether or not the terminal apparatus supports a predetermined function or information showing completion of introducing and testing of the predetermined function by the terminal apparatus. Note that in the following description, whether or not the predetermined function is supported includes whether or not the introducing and the testing of the predetermined function are completed.

For example, when the terminal apparatus supports the predetermined function, the terminal apparatus transmits information (parameter) showing whether or not the predetermined function is supported. When the terminal apparatus does not support the predetermined function, the terminal apparatus does not transmit the information (parameter) showing whether or not the predetermined function is supported. That is, whether or not the predetermined function is supported is notified by whether or not the information (parameter) showing whether or not the predetermined function is supported is transmitted. Note that notification of the information (parameter) showing whether or not the predetermined function is supported may be performed by using one bit of 1 or 0.

The radio resource control unit 1011 generates, or obtains from a higher node, downlink data (transport block), system information, an RRC message, a MAC CE, and the like mapped to the PDSCH of the downlink. The radio resource control unit 1011 outputs the downlink data to the transmission unit 103 and the other information to the control unit 102. The radio resource control unit 1011 manages various types of configuration information of the terminal apparatus.

The scheduling unit 1012 determines a frequency and a subframe to which physical channels (PDSCH and PUSCH) are to be assigned, the coding rate and the modulation scheme (or MCS) of the physical channels (PDSCH and PUSCH), a transmit power, and other information. The scheduling unit 1012 outputs the determined information to the control unit 102.

The scheduling unit 1012 generates information used for scheduling of the physical channels (PDSCH and PUSCH) based on a scheduling result. The scheduling unit 1012 outputs the generated information to the control unit 102.

The control unit 102 generates a control signal based on information input from the higher layer processing unit 101 to control the transmission unit 103 and the reception unit 104. The control unit 102 generates downlink control information based on the information input from the higher layer processing unit 101 and transmits the downlink control information to the transmission unit 103.

The transmission unit 103 generates a downlink reference signal in accordance with the control signal input from the control unit 102, codes and modulates the HARQ indicator, the downlink control information, and the downlink data input from the higher layer processing unit 101, multiplexes the PHICH, PDCCH, EPDCCH, PDSCH, and the downlink reference signal, and transmits the signal via the transmit/receive antenna 105 to the terminal apparatus 2.

The coding unit 1031 codes the HARQ indicator, the downlink control information, and the downlink data input from the higher layer processing unit 101 using a predetermined coding system such as block coding, convolutional coding, or turbo coding or using a coding system determined by the radio resource control unit 1011. The modulation unit 1032 modulates coding bits input from the coding unit 1031 by using a predetermined modulation scheme such as Binary Phase Shift Keying (BPSK), Quadrature Phase Shift Keying (QPSK), 16 Quadrature Amplitude Modulation (QAM), 64QAM, or 256QAM, or by using a modulation scheme determined by the radio resource control unit 1011.

The downlink reference signal generating unit 1033 generates a sequence as a downlink reference signal. The sequence is obtained according to a rule predetermined based on, for example, physical cell identity (PCI, cell ID) used to identify the base station apparatus 1A and is known to the terminal apparatus 2A.

The multiplexing unit 1034 multiplexes the modulation symbol of each modulated channel, the generated downlink reference signal, and the downlink control information. That is, the multiplexing unit 1034 maps the modulation symbol of each modulated channel, the generated downlink reference signal, and the downlink control information in the resource element.

The radio transmission unit 1035 performs Inverse Fast Fourier Transform (IFFT) of the multiplexed modulation symbol, and the like, to generate an OFDM symbol, adds a cyclic prefix (CP) to the OFDM symbol to generate a baseband digital signal, converts the baseband digital signal into an analog signal, cancels an excessive frequency component from the analog signal by filtering, up-converts the frequency of the analog signal to a carrier frequency, power-amplifies the analog signal, and outputs and transmits the analog signal from the transmit/receive antenna 105.

The reception unit 104 demultiplexes, demodulates, and decodes, according to the control signal input from the control unit 102, the reception signal received via the transmit/receive antenna 105 from the terminal apparatus 2A, and outputs the decoded information to the higher layer processing unit 101.

The radio reception unit 1041 down-converts an uplink signal received via the transmit/receive antenna 105 into a baseband signal, cancels unnecessary frequency components from the baseband signal, controls the amplification level to optimally maintain the signal level of the baseband signal, performs quadrature modulation of the base band signal based on the in-phase component and the quadrature component of the received signal to obtain an analog signal, and converts the analog signal obtained by the quadrature modulation into a digital signal.

The radio reception unit 1041 cancels a portion corresponding to the CP from the converted digital signal. The radio reception unit 1041 performs Fast Fourier Transform (FFT) on the signal from which the CP has been canceled, and the radio reception unit 1041 extracts a signal in a frequency domain and outputs the extracted signal to the demultiplexing unit 1042.

The demultiplexing unit 1042 demultiplexes the signal input from the radio reception unit 1041 into signals such as PUCCH, PUSCH, and an uplink reference signal. The demultiplexing operation is previously determined by the radio resource control unit 1011 of the base station apparatus 1A and is performed based on assignment information about the radio resource included in an uplink grant of which each terminal apparatus 2 is notified.

The demultiplexing unit 1042 compensates the PUCCH channel and the PUSCH channel. The demultiplexing unit 1042 also demultiplexes the uplink reference signal.

The demodulation unit 1043 performs Inverse Discrete Fourier Transform (IDFT) on the PUSCH, obtains a modulation symbol, and performs demodulation of reception signal on each of modulation symbols of the PUCCH and the PUSCH by using a predetermined modulation scheme such as BPSK, QPSK, 16QAM, 64QAM, or 256QAM or a modulation scheme of which the base station apparatus has previously notified each of the terminal apparatuses 2 by the uplink grant.

The decoding unit 1044 decodes the coding bits of the demodulated PUCCH and PUSCH at a coding rate of a predetermined coding system, where the coding rate is predetermined or the base station apparatus previously notifies the terminal apparatus 2 of the coding rate by the uplink grant, and the decoding unit 1044 outputs the decoded uplink data and the uplink control information to the higher layer processing unit 101. In case of retransmission on the PUSCH, the decoding unit 1044 performs decoding by using the coding bits in the HARQ buffer input from the higher layer processing unit 101 and the demodulated coding bits.

Figure 4:
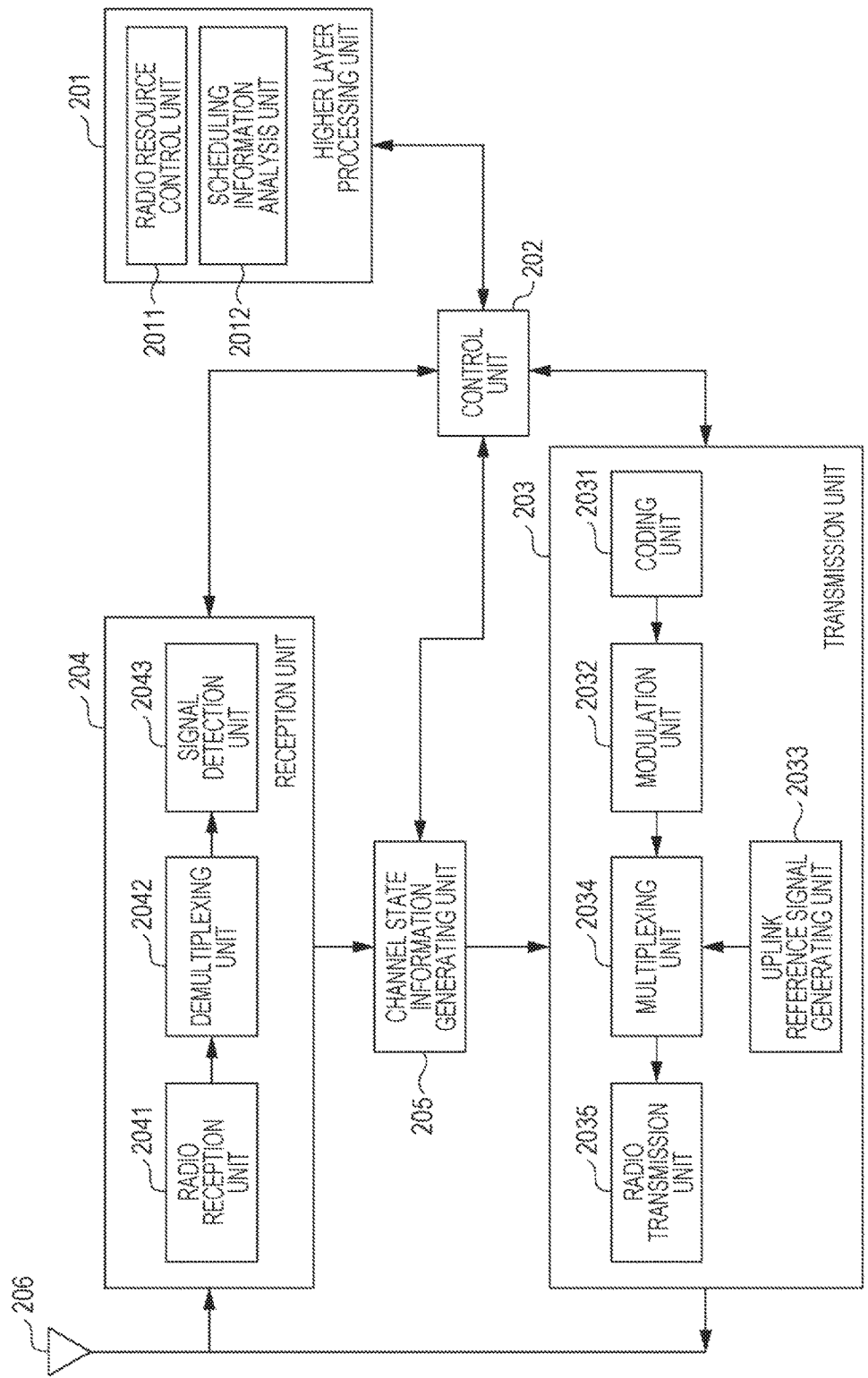
FIG. 4 is a block diagram illustrating a configuration example of a terminal apparatus according to the embodiment.

FIG. 4 is a block diagram schematically illustrating the configuration of a terminal apparatus 2A of the present embodiment. As illustrated in FIG. 3, the terminal apparatus 2A includes a higher layer processing unit (higher layer process step) 201, a control unit (control step) 202, a transmission unit (transmission step) 203, a reception unit (reception step) 204, a channel state information generating unit (channel state information generating step) 205, and a transmit/receive antenna 206. The higher layer processing unit 201 includes a radio resource control unit (radio resource control step) 2011 and a scheduling information analysis unit (scheduling information analysis step) 2012. The transmission unit 203 includes a coding unit (coding step) 2031, a modulation unit (modulation step) 2032, an uplink reference signal generating unit (uplink reference signal generating step) 2033, a multiplexing unit (multiplexing step) 2034, and a radio transmission unit (radio transmission step) 2035. The reception unit 204 includes a radio reception unit (radio reception step) 2041, a demultiplexing unit (demultiplexing step) 2042, and a signal detection unit (signal detection step) 2043.

The higher layer processing unit 201 outputs uplink data (transport block) generated by, for example, an operation by a user to the transmission unit 203. The higher layer processing unit 201 processes a Medium Access Control (MAC) layer, a Packet Data Convergence Protocol (PDCP) layer, a Radio Link Control (RLC) layer, and a Radio Resource Control (RRC) layer.

The higher layer processing unit 201 outputs information showing the function of the terminal apparatus to the transmission unit 203, the function being supported by the terminal apparatus.

The radio resource control unit 2011 manages various pieces of configuration information of the terminal apparatus. The radio resource control unit 2011 generates information mapped each uplink channel and transmits the information to the transmission unit 203.

The radio resource control unit 2011 obtains the configuration information relating to the CSI feedback transmitted from the base station apparatus and outputs the configuration information to the control unit 202.

The scheduling information analysis unit 2012 analyzes the downlink control information received via the reception unit 204 and determines the scheduling information. The scheduling information analysis unit 2012 generates control information based on the scheduling information to control the reception unit 204 and the transmission unit 203 and outputs the generated control information to the control unit 202.

The control unit 202 generates a control signal based on the information input from the higher layer processing unit 201 to control the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit the CSI generated by the channel state information generating unit 205 to the base station apparatus.

According to the control signal input from the control unit 202, the reception unit 204 demultiplexes, demodulates, and decodes the reception signal received via the transmit/receive antenna 206 from the base station apparatus 1A, and outputs the decoded information to the higher layer processing unit 201.

The radio reception unit 2041 down-converts a downlink signal received via the transmit/receive antenna 206 into a baseband signal, cancels unnecessary frequency components from the baseband signal, controls the amplification level to optimally maintain the signal level of the baseband signal, performs quadrature modulation of the base band signal based on the in-phase component and the quadrature component of the received signal to obtain an analog signal, and converts the analog signal obtained by the quadrature modulation into a digital signal.

The radio reception unit 2041 performs synchronization such as timing synchronization and frame synchronization of the converted digital signal by using the synchronization signal. The radio reception unit 2041 cancels a portion corresponding to the CP from the converted digital signal, performs Fast Fourier Transform on the signal from which the CP has been canceled, and extracts a signal in the frequency domain.

The demultiplexing unit 2042 demultiplexes the extracted signal into PHICH, PDCCH, EPDCCH, PDSCH, and downlink reference signals. The demultiplexing unit 2042 compensates the PHICH, PDCCH, and EPDCCH channels based on a channel estimation value of a desired signal obtained by channel measurement, detects downlink control information, and outputs the downlink control information to the control unit 202. The control unit 202 outputs the PDSCH and the channel estimation value of the desired signal to the signal detection unit 2043.

The signal detection unit 2043 detects a signal by using the PDSCH and the channel estimation value and outputs the signal to the higher layer processing unit 201.

The transmission unit 203 generates an uplink reference signal according to the control signal input from the control unit 202, codes and modulates the uplink data (transport block) input from the higher layer processing unit 201, multiplexes the PUCCH, the PUSCH, and the generated uplink reference signal, and transmits the multiplexed signals via the transmit/receive antenna 206 to the base station apparatus 1A.

The coding unit 2031 performs coding such as convolutional coding and block coding of the uplink control information input from the higher layer processing unit 201. The coding unit 2031 performs turbo coding based on information used for scheduling the PUSCH.

The modulation unit 2032 modulates the coding bits input from the coding unit 2031 in a modulation scheme such as BPSK, QPSK, 16QAM, and 64QAM notified by the downlink control information or a modulation scheme predetermined for each channel.

The uplink reference signal generating unit 2033 generates a sequence obtained by a predetermined rule (expression) based on an physical cell identity (PCI, referred to as for example, Cell ID) for identifying the base station apparatus 1A, a bandwidth to which the uplink reference signal is mapped, a cyclic shift notified by the uplink grant, and a value of a parameter with respect to generation of the DMRS sequence.

The multiplexing unit 2034 rearranges the modulation symbols of the PUSCH in parallel according to the control signal input from the control unit 202, and then performs Discrete Fourier Transform (DFT), The multiplexing unit 2034 multiplexes signals of the PUCCH and the PUSCH and the generated uplink reference signal for each transmit antenna port. That is, the multiplexing unit 2034 maps the signals of the PUCCH and the PUSCH and the generated uplink reference signal to the resource element of each transmit antenna port.

The radio transmission unit 2035 performs Inverse Fast Fourier Transform (IFFT) of the multiplexed signal to perform modulation in a SC-FDMA schema, generates a SC-FDMA symbol, adds a CP to the generated SC-FDMA symbol, generates a baseband digital signal, converts the baseband digital signal into an analog signal, cancels an excessive frequency component from the analog signal, converts the frequency of the analog signal into a carrier frequency, power-amplifies the analog signal, and outputs and transmits the analog signal to the transmit/receive antenna 206.

Programs which run on the base station apparatus and terminal apparatus of the present invention are programs for controlling a CPU, and the like (programs for operating a computer) to realize the functions of the embodiments relating to the present invention. Information processed in these apparatuses is temporarily accumulated in a RAM during processing, is then stored in various ROMs or HDDs, and is accordingly subjected to read, modify, and/or write operations by the CPU. The recording medium for storing the programs may be any of a semiconductor medium, (for example, ROM, nonvolatile memory card, etc.), an optical recording medium (for example, DVD, MO, MD, CD, BD, etc.), a magnetic recording medium (for example, magnetic tape, flexible disk, etc.), and other media. The functions of the embodiments are realized by executing loaded programs, but the functions of the embodiments may also be realized by performing processes based on instructions of the programs in combination with an operating system, other application programs, and the like.

When the programs are released to the market, the programs can be stored on portable recording media or can be transferred to server computers connected via a network such as the Internet. In this case, memory of server computers is included in the present invention. Some or all of the functional units of the terminal apparatus and the base station apparatus of the embodiments may typically be realized as an LSI, which is an integrated circuit. The functional blocks of the receiver may be individually made into chips, or some or all of the functional blocks may be integrated into a chip. When functional blocks are made; into an integrated circuit, an integrated circuit controlling unit for controlling the functional blocks is added.

A method for fabricating an integrated circuit is not limited to LSI but may be realized by using a dedicated circuit or a general purpose processor. When progress in semiconductor technology provides an integrated circuit technology replacing LSI, an integrated circuit formed by the provided integrated circuit technology can be used.

The invention of the present application is not limited to the embodiments described above. The terminal apparatus of the invention of the present application is not limited to application to the mobile station apparatus. The terminal apparatus is of course applicable to stationary or immovable electronic apparatuses, for example, AV equipment, kitchen appliances, cleaning/washing apparatuses, air conditioning apparatuses, office equipment, vending machines, and other living appliances installed indoors or outdoors.

While preferred embodiments of the invention have been described in detail with reference to the drawings, specific configurations are not limited to these embodiments, and designs and other modifications which do not depart from the spirit of the invention are included within the scope of the claims.

INDUSTRIAL APPLICABILITY

The present invention is suitable for use in terminal apparatuses and communication methods.

Note that, the present international application claims priority from Japanese Patent Application No. 2015-050195 filed on Mar. 13, 2015, and the entire contents of Japanese Patent Application No. 2015-050195 are hereby incorporated herein by reference.

REFERENCE SIGNS LIST 1A, 1B BASE STATION APPARATUS
2A, 2B, 2C TERMINAL APPARATUS
101 HIGHER LAYER PROCESSING UNIT
102 CONTROL UNIT
103 TRANSMISSION UNIT
104 RECEPTION UNIT
105 TRANSMIT/RECEIVE ANTENNA
1011 RADIO RESOURCE CONTROL UNIT
1012 SCHEDULING UNIT
1031 CODING UNIT
1032 MODULATION UNIT
1033 DOWNLINK REFERENCE SIGNAL GENERATING UNIT
1034 MULTIPLEXING UNIT
1035 RADIO TRANSMISSION UNIT
1041 RADIO RECEPTION UNIT
1042 DEMULTIPLEXING UNIT
1043 DEMODULATION UNIT
1044 DECODING UNIT
201 HIGHER LAYER PROCESSING UNIT
202 CONTROL UNIT
203 TRANSMISSION UNIT
204 RECEPTION UNIT
205 CHANNEL STATE INFORMATION GENERATING UNIT
206 TRANSMIT/RECEIVE ANTENNA
2011 RADIO RESOURCE CONTROL UNIT
2012 SCHEDULING INFORMATION ANALYSIS UNIT
2031 CODING UNIT
2032 MODULATION UNIT
2033 UPLINK REFERENCE SIGNAL GENERATING UNIT
2034 MULTIPLEXING UNIT
2035 RADIO TRANSMISSION UNIT
2041 RADIO RECEPTION UNIT
2042 DEMULTIPLEXING UNIT
2043 SIGNAL DETECTION UNIT

The invention claimed is:
1. A terminal apparatus configured to communicate with a base station apparatus, the terminal apparatus comprising:
reception circuitry configured to receive, from the base station apparatus, a plurality of first signals, and receive first information related to an arrangement of the plurality of first signals; and
transmission circuitry configured to transmit a first identifier associated with one of the plurality of first signals, wherein the first information indicates the first identifier and a second identifier, the second identifier being associated with a first signal other than the one of the plurality of first signals, and the first identifier is associated with a difference of the one of the plurality of first signals from a reference position.

2. The terminal apparatus according to claim 1, wherein the reception circuitry receives second information related to a configuration of a channel state information reference signal (CSI-RS), the second information including a CSI-RS index and one of the first identifier and the second identifier, and the transmission circuitry transmits measurement results including a reference signal received power (RSRP) or a reference signal received quality (RSRQ), the RSRP and the RSRQ being based on the second information.

3. The terminal apparatus according to claim 1, wherein the reception circuitry receives at least a first synchronization signal of the plurality of synchronization signals with a first precoding or a first beam forming pattern, the first precoding or the first beam forming pattern being different from a precoding pattern or a beam forming pattern of a synchronization signal other than the first synchronization signal of the plurality of synchronization signals.

4. A base station apparatus configured to communicates with a terminal apparatus, the base station apparatus comprising:

transmission circuitry configured to transmit a plurality of first signals, and transmit first information related to an arrangement of the plurality of first signals, and reception circuitry configured to receive a first identifier associated with one of the plurality of first signals, wherein the first information indicates the first identifier and a second identifier, the second identifier being associated with a first signal other than the one of the plurality of first signals, and the first identifier is associated with a difference of the one of the plurality of first signals from a reference position.

5. The base station apparatus according to the claim 4, wherein the transmission circuitry transmits second information related to a configuration of a channel state information reference signal (CSI-RS), the second information including a CSI-RS index and one of the first identifier and the second identifier, and the reception circuitry receives measurement results including a reference signal received power (RSRP) or a reference signal received quality (RSRQ), the RSRP and the RSRQ being based on the second information.

6. The base station apparatus according to the claim 4, wherein the transmission circuitry transmits at least a first synchronization signal of the plurality of synchronization signals by using a first precoding or a first beam forming pattern, the first precoding or the beam forming pattern being different from a precoding or a beam forming pattern of a synchronization signal other than the first synchronization signal of the plurality of synchronization signals.

7. A communication method for a terminal apparatus configured to communicate with a base station apparatus, the communication method comprising:

receiving, from the base station apparatus, a plurality of first signals, and receiving first information related to an arrangement of the plurality of first signals; and transmitting a first identifier associated with one of the plurality of first signals, wherein the first information indicates the first identifier and a second identifier, the second identifier being associated with a first signal other than the one of the plurality of first signals, and the first identifier is associated with a difference of the one of the plurality of first signals from a reference position.

8. A communication method for a base station apparatus configured to communicate with a terminal apparatus, the communication method comprising:

transmitting a plurality of first signals, and transmitting first information related to an arrangement of the plurality of first signals, and receiving a first identifier associated with one of the plurality of first signals, wherein the first information indicates the first identifier and a second identifier, the second identifier being associated with a first signal other than the one of the plurality of first signals, and the first identifier is associated with a difference of the one of the plurality of first signals from a reference position.

* * * * *